United States Patent [19]
Asahi

[11] Patent Number: 6,034,800
[45] Date of Patent: Mar. 7, 2000

[54] NXN LIGHT MATRIX SWITCH

[75] Inventor: Koji Asahi, Tokyo, Japan

[73] Assignee: NEC Corporation, Tokyo, Japan

[21] Appl. No.: 08/844,722

[22] Filed: Apr. 18, 1997

[30] Foreign Application Priority Data

Apr. 19, 1996 [JP] Japan ................................. 8-098511

[51] Int. Cl.[7] .................................................. H04J 14/02
[52] U.S. Cl. ........................... 359/128; 385/17; 359/127
[58] Field of Search .................................. 359/126, 127, 359/177, 120, 121, 163, 128; 385/24, 46, 16–17

[56] References Cited

U.S. PATENT DOCUMENTS

| | | | |
|---|---|---|---|
| 5,233,453 | 8/1993 | Sivarajan et al. | 359/117 |
| 5,724,167 | 3/1998 | Sabella | 359/128 |
| 5,739,935 | 4/1998 | Sabella | 359/128 |
| 5,754,320 | 5/1998 | Watanabe et al. | 359/117 |

FOREIGN PATENT DOCUMENTS

| | | |
|---|---|---|
| 64-90696 | 4/1989 | Japan . |
| 1-187537 | 7/1989 | Japan . |
| 2-93436 | 4/1990 | Japan . |
| 5-276546 | 10/1993 | Japan . |
| 6-153248 | 5/1994 | Japan . |
| 6-224850 | 8/1994 | Japan . |
| 7-199252 | 8/1995 | Japan . |
| 8-65266 | 3/1996 | Japan . |

*Primary Examiner*—Kinfe-Michael Negash
*Attorney, Agent, or Firm*—Whitham, Curtis & Whitham

[57] ABSTRACT

The n×n light matrix switch of the present invention comprises a n:1 optical coupler for wavelength-multiplexing the n input light signals having different wavelengths, a 1:n optical divider for dividing the wavelength-multiplexed light signals to n light signals, n wavelength tunable light band pass filter for extracting only an arbitrary one wavelength component out of n-divided light signals, and a controlling circuit for controlling the pass center frequency of the n wavelength tunable light band pass filter. The n wavelength tunable light band pass filters connected to the n output terminals supply all the n input light signal components which are wavelength-division-multiplexed. Thereby, any output terminal can select an arbitrary light signal out of n inputs quite independently from other output terminals. Further, there are n objects to be controlled which prescribes the connecting condition between input signal and output signal, this number is less than that of the conventional n×n light matrix switch. The n×n light matrix switch having the simple structure can provides excellent operability without blocking phenomenon.

4 Claims, 9 Drawing Sheets

NXN LIGHT MATRIX SWITCH

BACKGROUND OF THE INVENTION

1. Field of the Invention

This invention relates to a n×n light matrix switch capable of switching the optical paths of n light signals supplied from n input terminals to output them to n output terminals, particularly relates to a light matrix switch for light-switching wavelength multiplexed light signals.

2. Description of Related Art

Conventionally, a n×n light matrix switch is structured by combining 2×2 light switch elements depending on the number of input terminals. The light signal is supplied from input terminals, the path is determined while the light signal is passing through the switch elements, and the light path is connected to any one of output terminals, then the light is outputted from the output terminal. Usually $LiNbO_3$ waveguide type light switches have been used as the 2×2 light switch element. 2×2 light switch elements are arranged on a $LiNbO_3$ substrate, and the light waveguide is used for connecting between switch elements.

When the light path of a light signal passing through a light matrix switch is switched, the path of other light signals the path of which are not switched is cut off and the cut-off causes blocking phenomenon. To avoid the blocking phenomenon, at least nC2 units of 2×2 light switches are required to construct a n×n light matrix switch having the structure comprising the combination of 2×2 light switches. It is easily understandable by considering the preposition that, in the operation for switching the path of a single light signal while full n input light signals are inputted, it is required to perform the operation for switching between the light signal which is already outputted to the output terminal to be switched and the light signal which is desired to be switched using any one of 2×2 light switch elements, that is, this operation is replaced with the operation that two inputs are selected out of n inputs for switching.

For example, at least 28 switch elements are necessary to construct a 8×8 matrix switch, and at least 120 2×2 light switch elements are necessary to construct a 16×16 matrix switch, this size is the significantly large scale structure. From the view point of the large number of light switch elements, the conventional structure is not suitable for a large scale matrix switch.

Though blocking phenomenon does not occur, a n×n light matrix switch having the structure of combined 2×2 switch elements as described herein above requires an increased number of 2×2 light switch elements with increasing of the number of input terminals. The whole structure is large, and the control means becomes complex because the number of objects to be controlled is the same as the number of elements.

The conventional n×n light matrix switch having another structure has been known which comprises a wavelength conversion circuit, optical coupler, and wavelength demultiplexer in addition to light signal input terminal and light signal output terminal. The light signal inputted to the input terminal is converted to a light wavelength corresponding to a specific output terminal by the wavelength conversion circuit, subjected to wavelength division multiplexing in the optical coupler, and then outputted to the wavelength demultiplexer. The wavelength-division-multiplexed light signal is wavelength-multiplexed to light signals with wavelengths $\lambda 1$ to $\lambda n$ by the wavelength demultiplexer and outputted to respective light output terminals. By combining these wavelength conversion, wavelength division multiplexing, and wavelength demultiplexing operations, the function of a n×n light matrix switch which connects between specific n input terminals and n output terminals is realized.

This structure is advantageous in comparison with the above-mentioned structure in that the structure can be small sized, however, the wavelength is shifted for switching the path of a light signal. In the switching transition condition, the wavelength of the sifted light signal can be the same wavelength of other signal which is not switched. The shifting can cause blocking phenomenon.

In the former conventional structural example, the input light is set in 1:1 by the path in the space, on the other hand, in the latter conventional structural example, the input light signal is converted to one specific wavelength corresponding to the output terminal, therefore in both cases, the input signal appears only at any one of output terminals. In other words, one input signal can not be outputted to a plurality of output terminals selectively, this is another disadvantage of the conventional light matrix switch.

SUMMARY OF THE INVENTION

The present invention relates to a n×n light matrix switch, and It is the object of the present invention to provide the n×n light matrix switch having various advantages of the simple structure, no blocking phenomenon, and excellent operability.

A n×n light matrix switch comprises an optical coupler for receiving n light signals having different wavelengths each other (n is a natural number) and for wavelength-multiplexing the n light signals to output the multiplexed light signals, and an optical divider for dividing the multiplexed light signals to n light signals to output the divided light signals from the n output terminals respectively. Further the n×n light matrix switch comprises n wavelength tunable light band pass filters disposed subsequent to the respective output terminals for extracting selectively an arbitrary one wavelength component out of the each divided light signals to output selected divided light signals, and a frequency control circuit for controlling the pass center frequency of the n wavelength tunable light band pass filters.

The n×n light matrix switch of the present invention comprises the first light amplifier provided between the optical coupler and the optical divider for directly amplifying the multiplexed signals over all the wavelength bands to supply the amplified multiplexed light signals to the optical divider.

The n×n light matrix switch of the present invention comprises n add-and-drop wavelength tunable light band pass filters provided subsequent to the optical amplifier having two input terminals and two output terminals the first input terminal and the first output terminal of which optical amplifier are connected in series for allowing to pass selectively the amplified multiplexed light signals by controlling variably the light pass band dependently on the external control signal to output selected amplified signals.

The n×n light matrix switch of the present invention comprises the add-and-drop wavelength tunable light band pass filter having a wavelength select function for extracting selectively an arbitrary one wavelength component out of the multiplexed light signals supplied from the preceding step to the first input terminals to output the selected light signal to the first output terminals. A sending function for sending components other than the selected one wavelength component to the next step through the second output terminals, and a wavelength multiplexing function for wavelength-multiplexing the light signal having the same wavelength as that of the selected one wavelength component to the selected light signal to output the multiplexed selected light signal. These functions renders the n×n light matrix switch capable to select whether the multiplexed selected light signals supplied from the preceding step are allowed to pass to the next step or an arbitrary wavelength is subjected to add-and-drop.

The n×n light matrix switch of the present invention comprises an optic-to-electric conversion circuit for converting n respective light signals supplied to the input terminals to eclectic signals, and n optical regenerating circuit for converting the light signals to light signals having wavelengths different each other previously prescribed out of wavelengths λ1 to λn.

In the n×n light matrix switch of the present invention, n input light signal components which are all wavelength-division-multiplexed are supplied to the n wavelength tunable light band pass filters connected to the input terminals. Thereby, any output terminal can select an arbitrary light signal out of n inputs quite independently from other output terminals. Further, there are n objects to be controlled which prescribes the connecting condition between input signal and output signal, this number is less than that of the conventional n×n light matrix switch.

The n×n light matrix switch of the present invention comprises a means for light-direct-amplifying every n input signal components in addition to the above-mentioned structure, thereby the signal loss between input and output is compensated, and thus input light signal is outputted to the output terminals without loss in signal level.

The n×n light matrix switch of the present invention comprises a means for adding-and-dropping an arbitrary signal component out of the n input light signals in addition to the above-mentioned structure, thereby only light signals with degraded S/N ratio are separated, and S/N ratio is improved using means for optic-to-electric conversion and for electric-to-optic conversion, and then the light signal is added again. As the result, the reliability of the signal transmission is improved.

The n×n light matrix switch of the present invention comprises a mans for regenerating and interchanging every input light signals in addition to the above-mentioned structure, thereby the S/N ratio of the signal which passes the light switch is improved.

BRIEF DESCRIPTION OF THE DRAWINGS

The above and other object, features and advantages of the present invention will become more apparent from the following detailed description when taken in conjunction with the accompanying drawings wherein.

DETAILED DESCRIPTION OF THE PREFERRED EMBODIMENT

First, the conventional n×n light matrix switch is described for easy understanding of the principle of the present invention prior to the description of n×n light matrix switch in accordance with the present invention.

Figure 1:
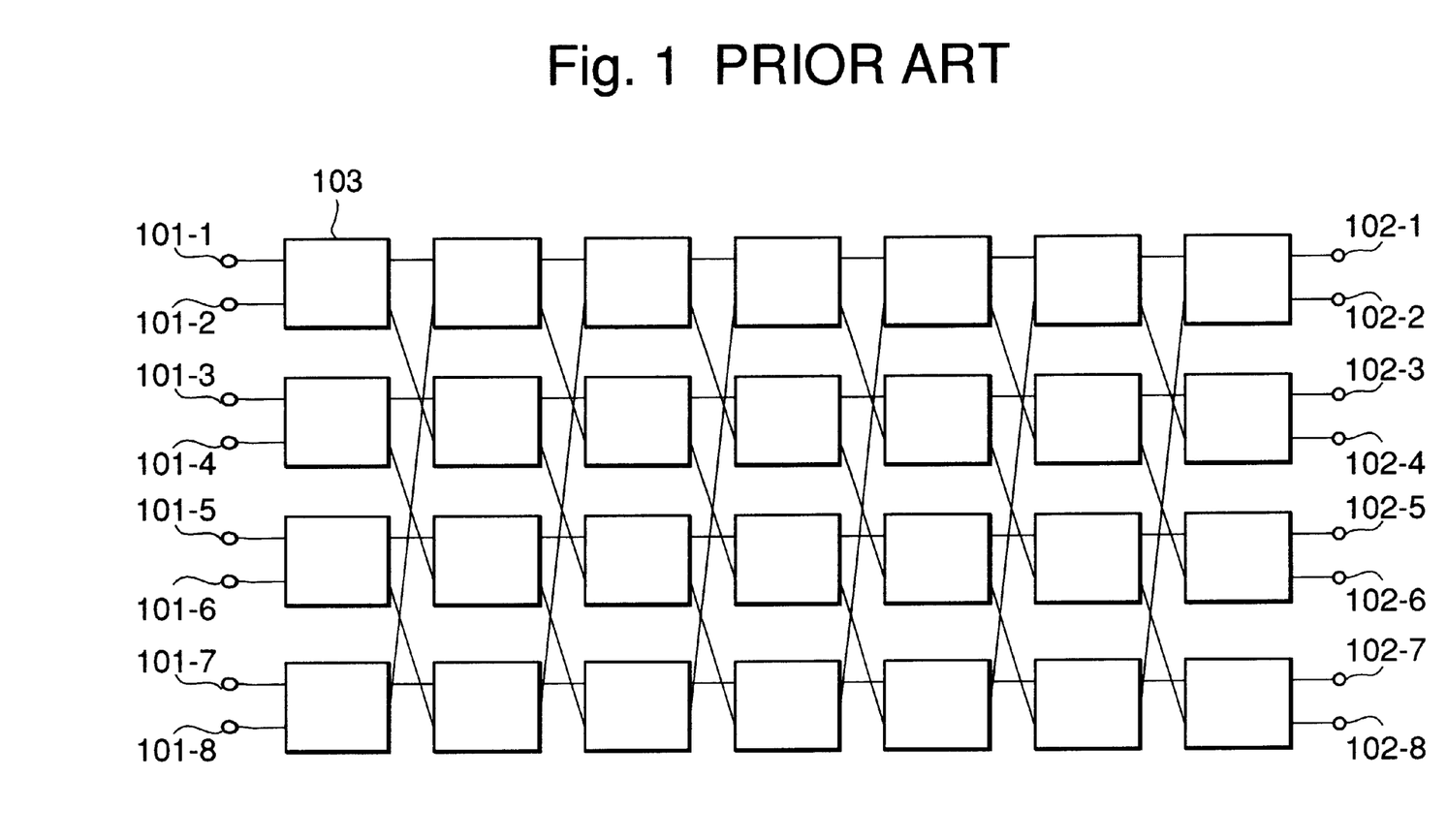
FIG. 1 is a diagram for illustrating one example of the conventional n×n light matrix switch.

FIG. 1 shows one example of the structure of the first conventional n×n light matrix switch having n input and output terminals. In FIG. 1, 101-1 to 101-8 are light signal input terminals, 102-1 to 102-8 are light signal output terminals, and 103 is a 2×2 light switch element.

Eight light signals inputted from the input terminals 101-1 to 101-8 are set to the path during the passage through total seven 2×2 light switch elements. The input light signals are light-path switched and light-path connected, and outputted to any one of output terminals 102-1 to 102-8 respectively.

In the example of the conventional structure shown in FIG. 1, the whole structure is composed of 2×2 light switch elements 103, usually LiNbO$_3$ waveguide type light switch is used as the 2×2 light switch element. 2×2 light switch elements 103 are arranged on a LiNbO$_3$ substrate in matrix arrangement, and light waveguides are used for connecting between the switch elements.

When the light path of a light signal passing in the light matrix switch is switched, the switching causes blocking phenomenon due to the cut-off of the path of other light signals which are not switched. In the case of the structure comprising the combination of 2×2 light switch elements as shown in FIG. 1, at least nC$_2$ 2×2 light switches are required for a n×n light matrix switch to avoid the blocking phenomenon.

It is easily understandable by considering the preposition that, in the operation for switching the path of a single light signal while full n input light signals are inputted, it is required to perform the operation for switching between the light signal which is already outputted to the output terminal to be switched and the light signal which is desired to be switched using any one of 2×2 light switch elements. That is, this operation is replaced with the operation that two inputs are selected out of n inputs for switching.

Accordingly, to structure a 8×8 light matrix switch as shown in FIG. 1, at least 28 switch elements are required. A 16×16 light matrix switch requires at least 120 2×2 light switch elements, this is a large scale structure. As described herein above, the structure as shown in FIG. 1 is not suitable for a large scale light matrix switch.

Next, the conventional n×n light matrix switch having another structure is described. The conventional n×n light matrix switch shown in FIG. 2 comprises light signal input terminals 101-1 to 101-n, light signal output terminals 102-1 to 102-n, wavelength conversion circuits 104-1 to 104-n, an optical coupler 105, and a wavelength multiplexer 106.

Figure 2:
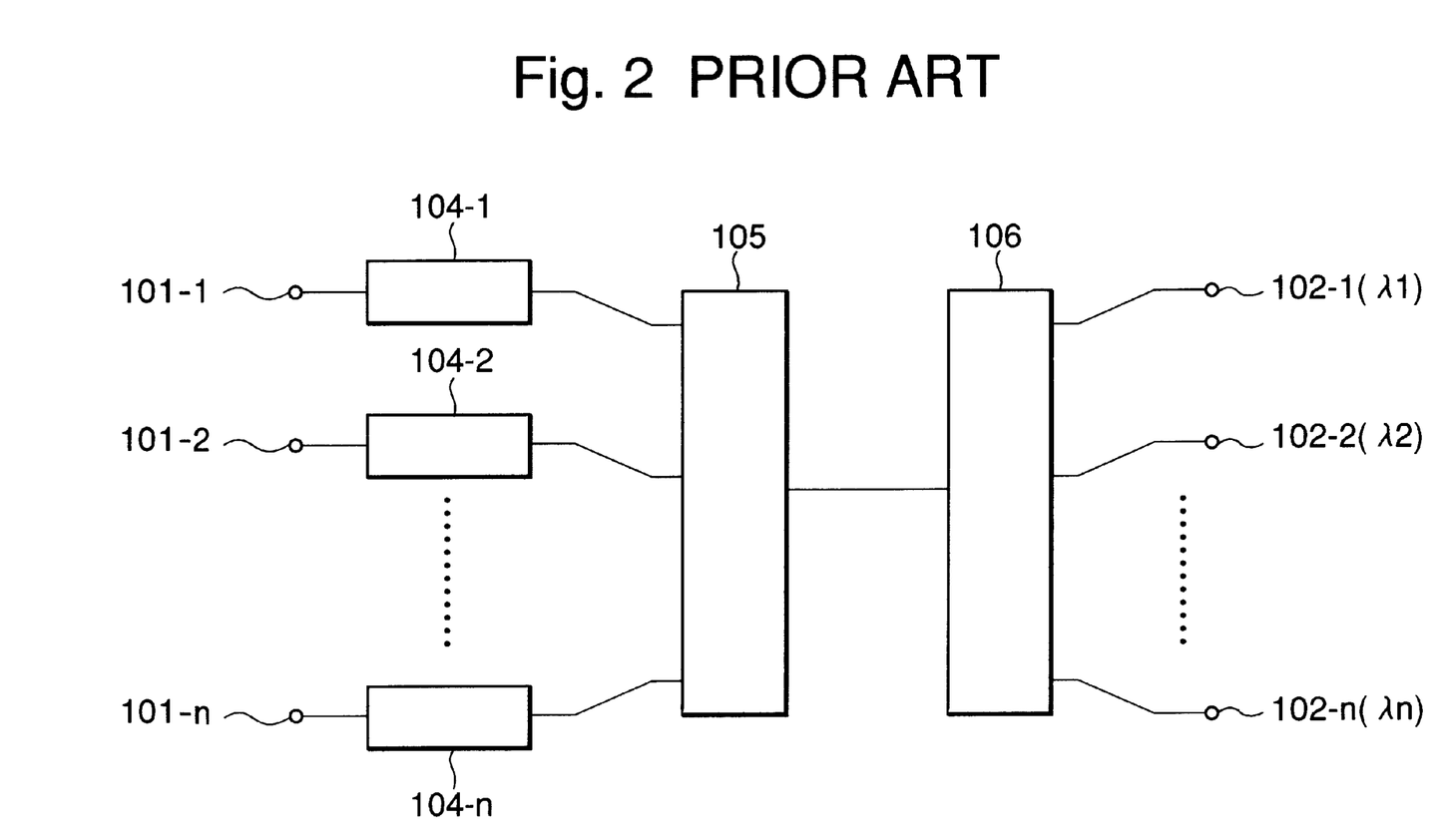
FIG. 2 is a diagram for illustrating another example of the conventional n×n light matrix switch.

In FIG. 2, light signals inputted to the input terminals 101-1 to 101-n are converted to light signals having light wavelengths corresponding respectively to specific output terminals in the wavelength conversion circuits 104-1 to 104-n, wavelength-division-multiplexed by the optical coupler 105, and inputted to the wavelength demultiplexer 106. The wavelength-division-multiplexed light signals are divided to wavelength λ1 to λn by the wavelength demultiplexer 106, and outputted to respective light output terminals 102-1 to 102-n. By combining these wavelength conversion, wavelength division multiplexing, and wave division, the function of a n×n light matrix switch for connecting between specific n input terminals and n output terminals is realized.

The structure shown in FIG. 2 is advantageous in comparison with the structure shown in FIG. 1 in that the former can be small sized, however, the wavelength is shifted by the wavelength conversion circuit when the path of one light signal is switched. Therefore, the wavelength of the sifted light signal can be the same as that of other wavelength signal the path of which is,not switched in the switching transition condition, and the shifting can cause blocking phenomenon.

The conventional n×n light matrix switch involves problems as described herein under. In detail, first the conventional structure shown in FIG. 1 is disadvantageous in that the required number of 2×2 light switches of a n×n light matrix switch increases significantly with increasing of the number of input terminals though the n×n light matrix switch is not involved in blocking phenomenon. The whole structure is large, and the control means becomes complex because the number of objects to be controlled is the same as the number of elements.

This structure shown in FIG. 2 is advantageous in comparison with the above-mentioned structure in that the structure can be small sized, however, the wavelength is shifted for switching the path of a light signal. The wavelength of the sifted light signal can be the same as that of other wavelength signal the path of which is not switched in the switching transition condition, and the shifting can cause blocking phenomenon.

In the conventional structural example shown in FIG. 1, the input light is set in 1:1 by the path in the space, on the other hand, in the conventional structural example shown in FIG. 2, the input light signal is converted to one specific wavelength corresponding to the output terminal, therefore in both cases, the input signal appears only at any one of output terminals. In other words, one input signal can not be outputted to a plurality of output terminals selectively, this is another disadvantage of the conventional light matrix switch.

Next, the structure of n×n light matrix switch in accordance with the present invention is described referring to the drawings.

Figure 3:
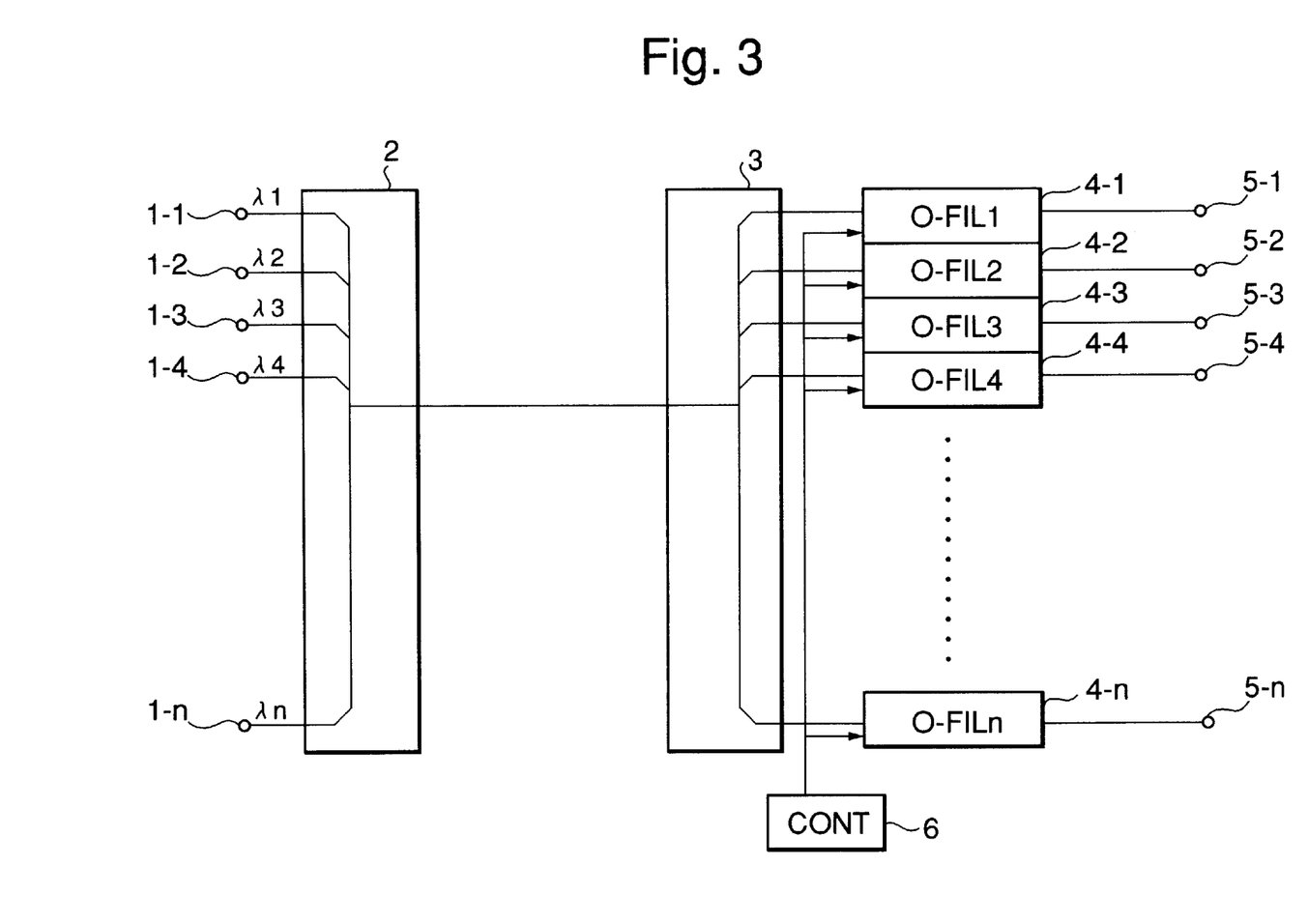
FIG. 3 is a diagram for illustrating the structure of the first embodiment of a n×n light matrix switch in accordance with the present invention.

FIG. 3 shows the structure of the first embodiment of a n×n light matrix switch in accordance with the present invention. In FIG. 3, 1-1 to 1-n are light signal input terminals, 2 is an n:1 light coupler, 3 is a 1:n optical divider, 4-1 to 1-n are wavelength tunable light band pass filter (O-FIL), 5-1 to 1-n are light signal output terminals, and 6 is a control circuit of the wavelength tunable light band pass filter.

In FIG. 3, n light signals with different wavelengths are inputted to the input terminals 1-1 to 1-n. These n light signals are subjected to wavelength division multiplexing in the n:1 optical coupler 2. The light signals subjected to wavelength division multiplexing are subjected to n distribution by the n:1 optical divider 3 and inputted to n wavelength tunable light band pass filters 4-1 to 4-n. Each wavelength tunable light band pass filter 4-1 to 4-n extracts an arbitrary one wavelength component from input light signal depending on wavelength select control signal inputted from the wavelength controller 6 and outputs it to the output terminals 5-1 to 5-n. The wavelength controller 6 sends the control signal to n wavelength tunable light band pass filters so that the center of pass wavelength coincides with the wavelength to be selected, and sets the path of the light signals.

Figure 7:
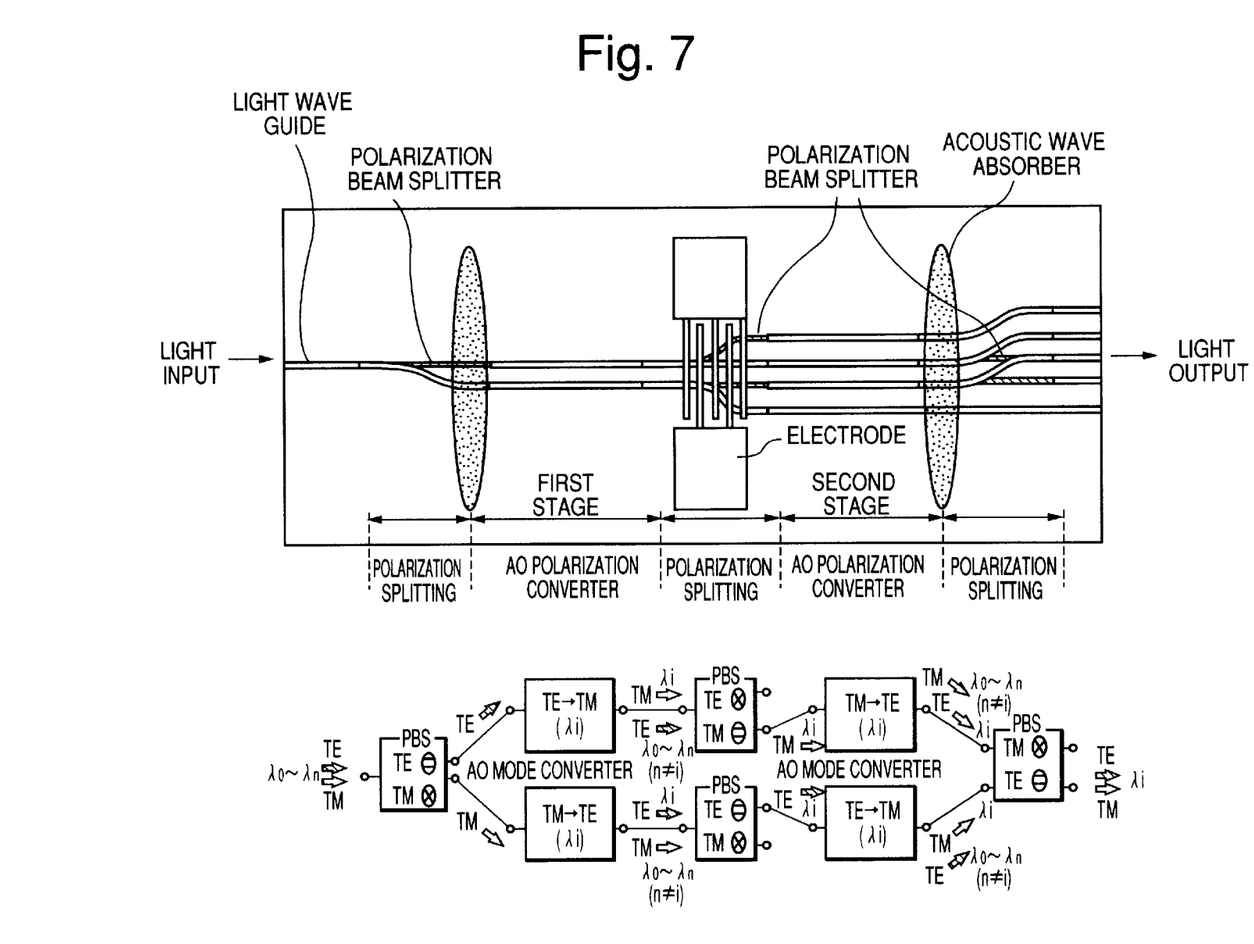
FIG. 7 is diagram for illustrating one embodiment of wavelength tunable light band pass filter used for the n×n light matrix switch in accordance with the present invention.

In this embodiment, as the O-FIL, a wavelength tunable light band pass filter which is capable of varying the central wavelength of pass band is used. An example of such tunable O-FIL includes, for example, an acousto-optic tunable filter (AOTF) which utilizes a acousto-optic element as shown in FIG. 7. An acousto-optic element comprises a waveguide, polarization beam splitter, AO acousto-optic polarization converter, and electrode disposed and formed on a $LiNbO_3$ substrate.

The element generates an output of wavelength component corresponding to the frequency by supplying the frequency of around 170 MHz to the electrode. In the AOTF, an input light signal is divided into TE wave and TM wave in the first polarization beam splitter, and only the specific wavelength component λi corresponding to the frequency supplied to the electrode is converted from TE wave to TM wave and TM wave to TE wave in the AO polarization converter. The operation of polarization beam splitting, polarization conversion, and polarization beam splitting is repeated, and finally the wavelength component λi is extracted.

Figure 8:
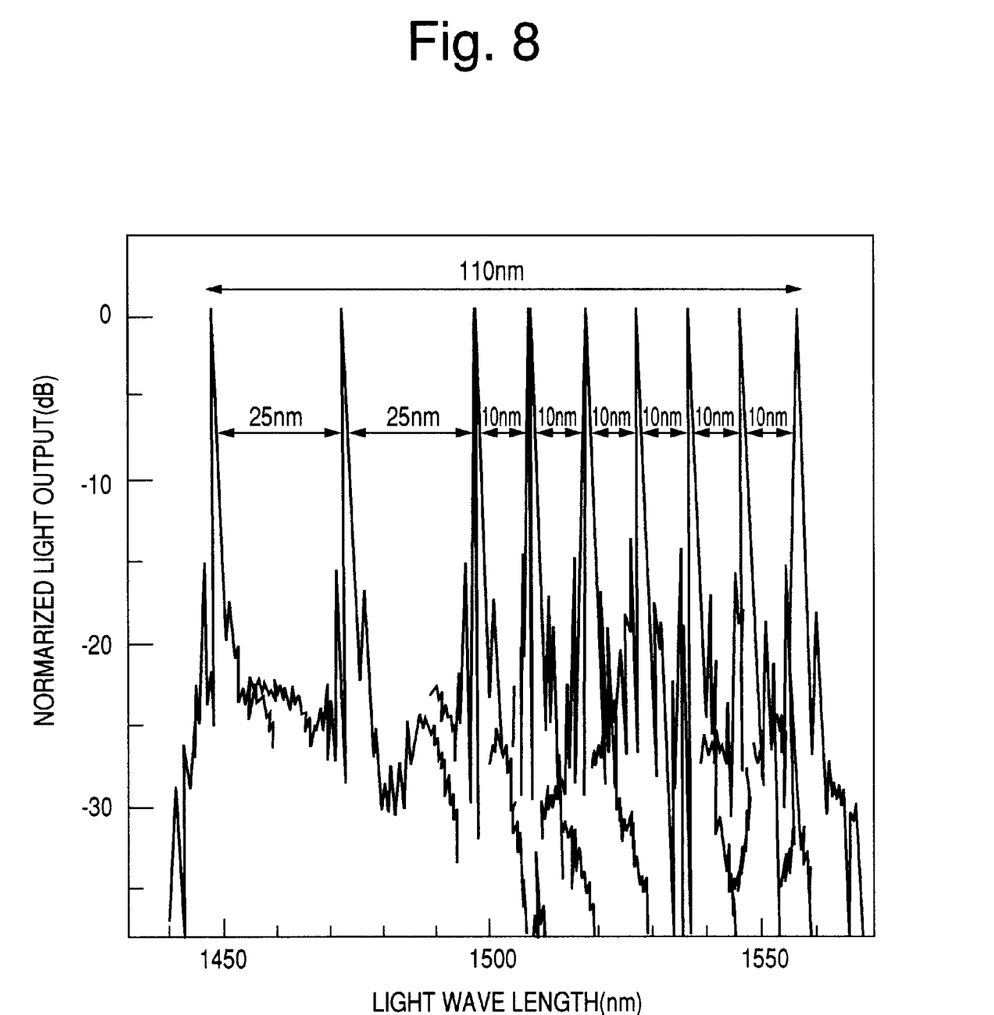
FIG. 8 is a diagram for illustrating an example of characteristics of the wavelength tunable light band pass filter shown in FIG. 7.

FIG. 8 shows an example of the pass wavelength characteristics of AOTF. This type of element has a feature of stable filter performance regardless of polarization of input light signal because it has two stages of AO polarization converters.

In the utilization of this element in the present invention, the element outputs the frequency varying around 170 MHz from the wavelength control circuit 6.

Figure 4:
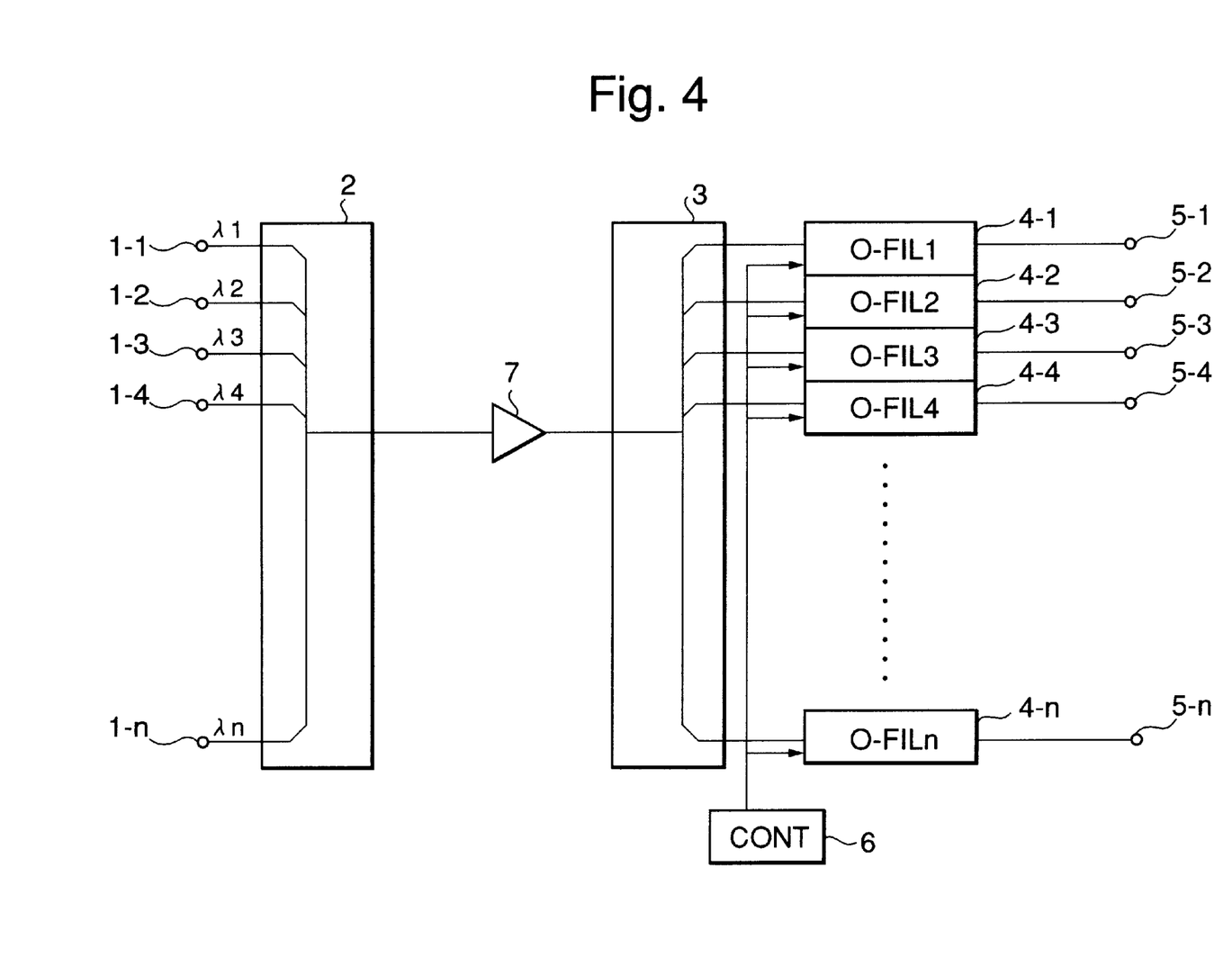
FIG. 4 is a diagram for illustrating the structure of the second embodiment of a n×n light matrix switch in accordance with the present invention.

FIG. 4 shows the structure of the second embodiment of a n×n light matrix switch in accordance with the present invention. FIG. 4, 1-1 to 1-n are light signal input terminals, 2 is an n:1 optical coupler, 3 is a 1:n optical divider, 4-1 to 4-n are wavelength tunable light band pass filters (O-FIL), 5-1 to 5-n are light signal output terminals, 6 is a controller of the wavelength tunable light band pass filter, and 7 is a light direct amplifier.

FIG. 4 shows a light matrix switch having the structure in which the light direct amplifier 7 is provided between the n:1 optical coupler 2 and 1:n optical divider 3 of the structure shown in FIG. 3. Erbium-added fiber amplifier (EDFA) is used as the light direct amplifier, and the wavelength band of n input light signals are subjected to light direct amplification.

Thereby, the loss in the n:1 optical coupler 2, 1:n optical divider 3, and wavelength tunable light band pass filters (O-FIL) 4-1 to 4-n in the structure shown in FIG. 4 is compensated, and thus the input light signal is outputted to the output terminals without loss in the level.

Next, embodiments of n×n light matrix switch in accordance with the present invention is described.

Figure 5:
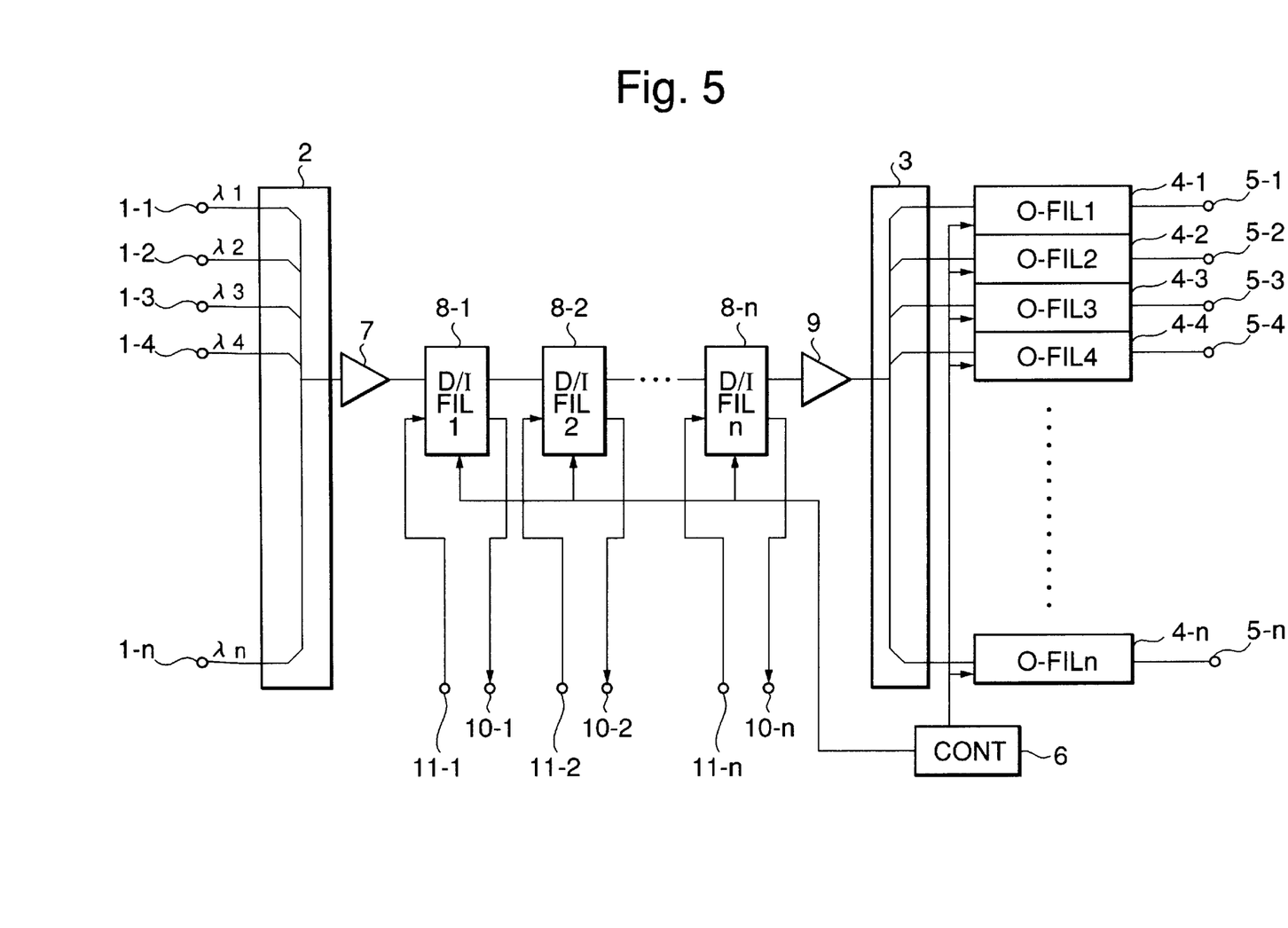
FIG. 5 is a diagram for illustrating the structure of the third embodiment of a n×n light matrix switch in accordance with the present invention.

FIG. 5 shows the third example of the n×n light matrix switch in accordance with the present invention. In FIG. 5, 1-1 to 1-n are light signal input terminals, 2 is n:1 optical coupler, 3 is 1:n optical divider, 4-1 to 4-n are wavelength tunable light band pass filters (D/I FIL), 5-1 to 5-n are light signal output terminals, 6 is a control circuit of the wavelength tunable light band pass filter, 7 is a light direct amplifier, 8-1 to 8-n are add-and-drop wavelength tunable light band pass filters (D/I FIL), 9 is a light direct amplifier, 10-1 to 10-n are divided light signal output terminals, and 11-1 to 11-n are added light signal input terminals.

In FIG. 5, a light signal subjected to wavelength division multiplexing in the n:1 optical coupler 2 is subject to light direct amplification in the light direct amplifier 7, and supplied to the add-and-drop wavelength tunable light band pass filters (D/I FIL) 8-1 to 8-n connected in series. The add-and-drop wavelength tunable light band pass filters 8-1 to 8-n extract an arbitrary one wavelength in the light signal which was subjected to wavelength division multiplexing and output it to the output terminals 10-1 to 10-n. The add-and-drop wavelength tunable light band pass filters 81 to 8-n output components other than that of the extracted one wavelength to the subsequent D/I FIL or light direct amplifier 9. Further, in the add-and-drop wavelength tunable light band pass filters 8-1 to 8-n, the light signal supplied from the input terminals 11-1 to 11-n having the same one wavelength as that extracted in the above-mentioned same D/I FIL is subjected to wavelength division multiplexing to a light signal to be supplied to the above-mentioned subsequent D/I FIL or light direct amplifiers 9.

The light wavelength to be added or dropped in the add-and-drop wavelength tunable light band pass filters 8-1 to 8-n is set by the wavelength select information from the wavelength controller 6. By selecting the wavelength other than those of the n input wavelength components, the add-and-drop wavelength tunable light band pass filters 8-1 to 8-n allow the n light signals to pass as they are without add-and-drop of the n light signals supplied from the light direct amplifier 7 or preceding D/I FIL.

The light signal outputted from the add-and-drop wavelength tunable light band pass filter 8-n is amplified by the light direct amplifier 9. Thereafter, the wavelength tunable light band pass filters 4-1 to 4-n extract only an arbitrary one wavelength component from the input light signal through the optical divider 3 depending on a wavelength select control signal supplied from the wavelength controller 6 as described in the first embodiment, and outputs it to the output terminals 5-1 to 5-n.

Figure 9:
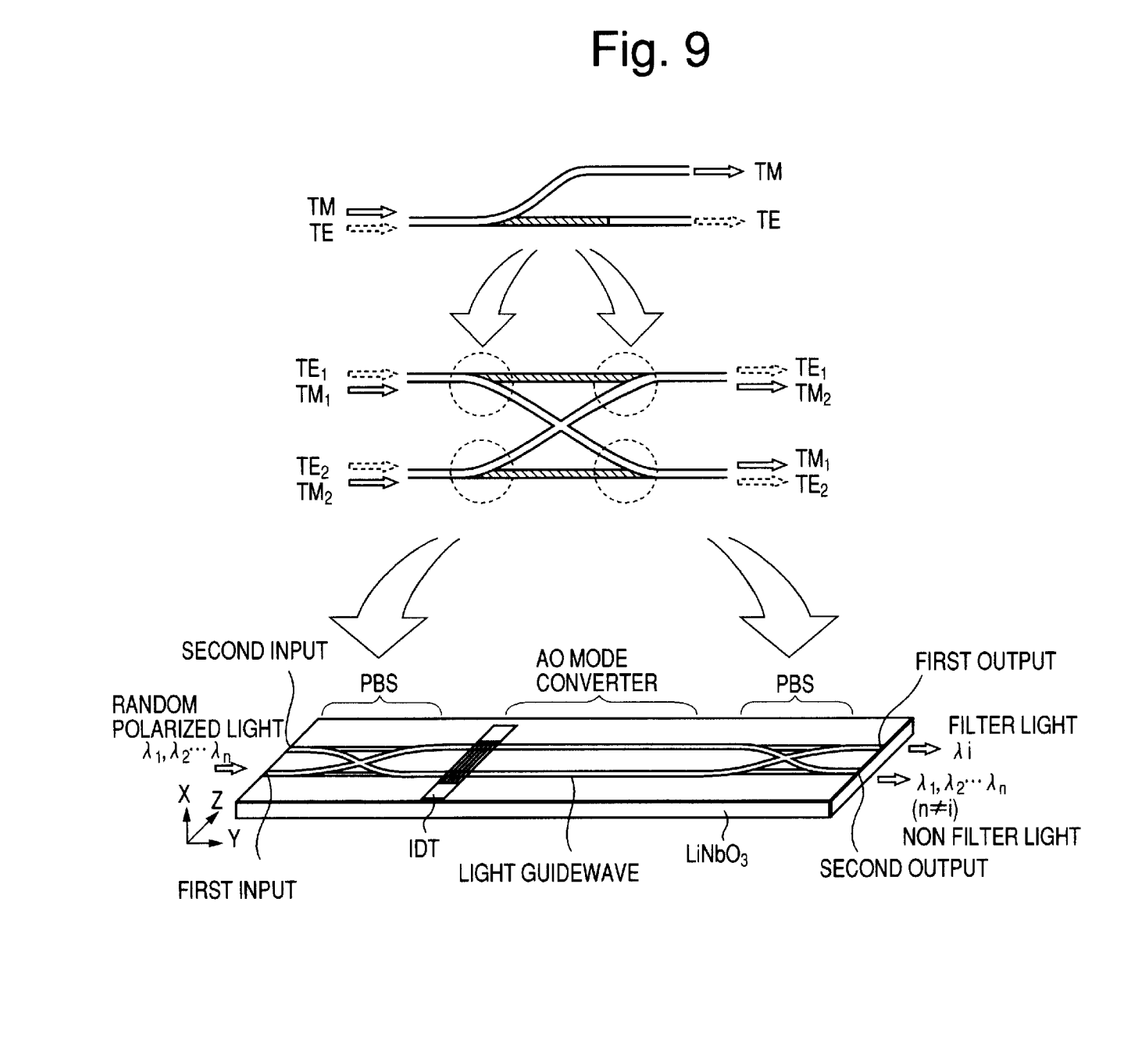
FIG. 9 is a diagram for illustrating one embodiment of add-and-drop wavelength tunable light band pass filter used for the third embodiment in accordance with the present invention.

The D/I FIL used in the embodiment in FIG. 5 is a D/I FIL which extracts variably the passing central wavelength. An examples of such tunable type D/I FIL includes, for example, AOTF which comprises a combination of a waveguide, polarization beam splitter, AO polarization converter, and electrode formed on a $LiNbO_3$ substrate as shown in FIG. 9. This element involves two inputs and two outputs.

In FIG. 9, when a light signal having wavelengths of $\lambda 1$ to $\lambda n$ which was subjected to wavelength multiplexing is supplied to the first input, the output of the wavelength component corresponding to the frequency is obtained at the first output by supplying the frequency around 170 MHz to the electrode, and the output of wavelength component other than the wavelength component for the first output is obtained at the second output.

In the AOTF, first the input light signal is divided to TE wave and TM wave by the first polarization beam splitter, and only the wavelength component $\lambda i$ specified correspondingly to the frequency supplied to the electrode is converted from TE wave to TM wave and from TM wave to TE wave in the AO polarization converter. Next, the operation of polarization splitting, polarization conversion, and polarization splitting is repeated, and finally the wavelength component $\lambda i$ and other wavelength components are outputted separately.

When a wavelength $\lambda i$ is supplied to the second input, the wavelength $\lambda i$ appears at the first output according to the above-mentioned principle, and wavelength-division-multiplexed into the light signal outputted at the second output. For applying this element to the present invention, the frequency varying around 170 MHz is outputted from the wavelength controlling circuit 6.

Figure 6:
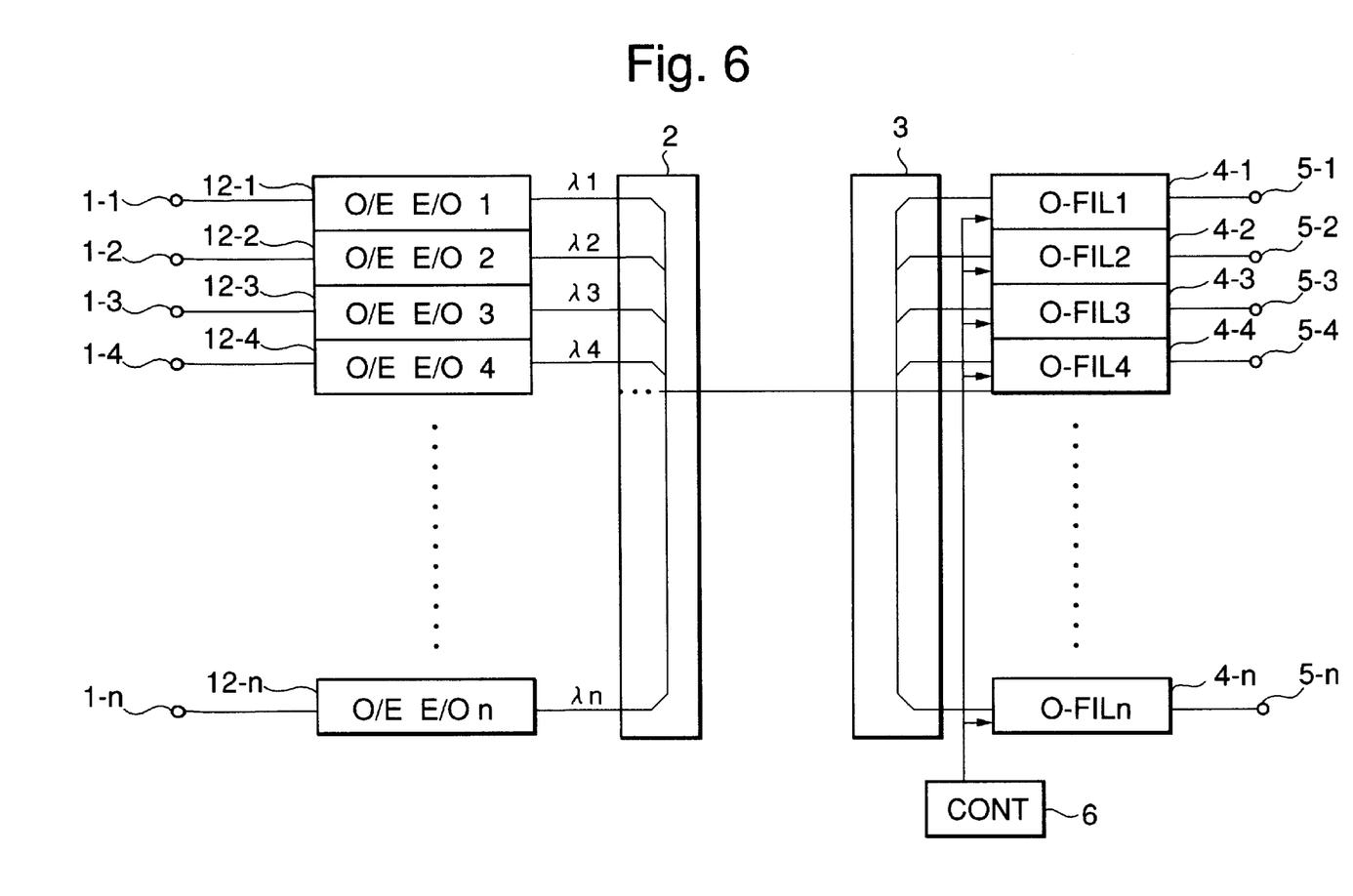
FIG. 6 is a diagram for illustrating the structure of the fourth embodiment of a n×n light matrix switch in accordance with the present invention.

Next, the fourth embodiment of a n×n light matrix switch in accordance with the present invention is described referring to FIG. 6.

In FIG. 6, 1-1 to 1-n are light signal input terminals, 2 is a n:1 optical coupler, 3 is a 1:n optical divider, 4-1 to 4-n are wavelength tunable light band pass filters (O-FIL), 5-1 to 5-n are light signal output terminals, 6 is a control circuit of the wavelength tunable light band pass filter, 12-1 to 12-n are optical regenerating circuit.

In FIG. 6, n light signals is supplied from the input terminals 1-1 to 1-n to the optical regenerating circuits 12-1 to 12-n. The optical regenerating circuits 12-1 to 12-n convert the input light signal once to the electric signal, and then convert it again to the light signal having a wavelength different from other optical regenerators the wavelength of which is prescribed previously out of wavelengths of $\lambda 1$ to $\lambda n$, and output it to the n:1 optical coupler 2.

The n light signals supplied from the optical regenerating circuits 12-1 to 12-n are subjected to wavelength multiplexing in the n:1 optical coupler 2. The light signal which was subjected to wavelength multiplexing is n-divided by the 1:n optical divider, and is supplied to the n wavelength tunable light band pass filters 4-1 to 4-n. The wavelength tunable light band pass filters 4-1 to 4-n extract only an arbitrary one wavelength component from the input light signal depending to the wavelength select control signal supplied from the wavelength controller 6, and output the extracted wavelength component to the output terminals 5-1 to 5-n.

The wavelength controller 6 sends a control signal to the n wavelength tunable light band pass filters so that the wavelength desired to be selected coincides with the pass center wavelength of the filter to determine the path of the light signals.

In the n×n light matrix switch of the present invention, the every n input light signal components which are wavelength-division-multiplexed are supplied to the n wavelength tunable light band pass filters connected to the output terminals. Thereby, an arbitrary light signal is selected quite independently from other output terminals out of n inputs at each output terminal. Further, there are n junctions for setting the connection condition between the input signal and output signal, the number of objects to be controlled is less than that of the conventional n×n light matrix switch.

The n×n light matrix switch of the present invention comprises a means for light-direct-amplifying every n input signal component in addition to the above-mentioned structure, thereby the signal loss between input and output is compensated, and thus input light signal is outputted to the output terminals without loss in signal level.

The n×n light matrix switch of the present invention comprises a means for adding-and-dropping an arbitrary signal component out of the n input light signals in addition to the above-mentioned structure, thereby only light signals with degraded S/N ratio are separated, and S/N ratio is improved using means for optic-to-electric conversion and for electric-to-optic conversion, and then the light signal is added again.

The n×n light matrix switch of the present invention comprises a mans for regenerating and interchanging every input light signals in addition to the above-mentioned structure, thereby the S/N ratio of the signal which passes the light switch is improved.

As the result, the reliability of signal transmission is improved.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. An n×n light matrix switch comprising:

optical coupling means for receiving n light signals having different wavelengths from each other (n is a natural number) and for wavelength-multiplexing said n light signals to output the multiplexed light signals, optical dividing means for dividing said multiplexed light signals to n light signals to output divided light signals from n output terminals respectively, n wavelength tunable type light pass band select means disposed subsequent to said respective output terminals for extracting selectively an arbitrary one wavelength component out of said each divided light signals to output selected divided light signals, and control means for controlling a pass of said n wavelength tunable light band pass filters, wherein said n×n light matrix switch is provided additionally with a first light amplification means provided between said optical coupling means and said optical dividing means for directly amplifying said multiplexed signals over an entire wavelength band to supply the amplified multiplexed light signals to said optical dividing means, wherein said n×n light matrix switch is provided with n add-and-drop wavelength tunable light band pass filters provided subsequent to said optical amplification means having first and second input terminals and first and second output terminals, wherein the first input terminal and the first output terminal of which are connected in series for allowing to pass selectively said amplified multiplexed light signals by controlling variably the light pass band dependently on an external control signal to output selected amplified signals, wherein said n×n light matrix switch is provided with a second light amplification means provided subsequent to said n add-and-drop wavelength tunable light band pass filters for amplifying said selected amplified signals, wherein said add-and-drop wavelength tunable light band pass filter includes:

wavelength select means for extracting selectively an arbitrary one wavelength component out of the multiplexed light signals supplied from a preceding step to said first input terminals to output the selected light signal to said first output terminals, sending means for sending components other than said one wavelength component to a next step through the second output terminals, wavelength multiplexing means for wavelength-multiplexing the light signal having the same wavelength as that of said one wavelength component to said selected light signal to output the multiplexed selected light signal, and add-and-drop select means for selecting between the passing means which allows the multiplexed selected light signal supplied from the preceding step to pass to the next step as it is and the add-and-drop means which is for add-and-drop of arbitrary wavelength.

2. The n×n light matrix switch as claimed in claim 1, wherein said n×n light matrix switch further comprising;

optic-to-electric conversion means for converting n respective light signals supplied to the input terminals to eclectic signals, and n optical regenerating means for converting the electrical signals to light signals having wavelengths different each other previously prescribed one of wavelengths $\lambda 1$ to $\lambda n$.

3. The n×n light matrix switch as claimed in claim 1, wherein said n×n light matrix switch includes an acousto-optical element.

4. The n×n light matrix switch as claimed in claim 1, wherein said add-and-drop wavelength tunable light band pass filter includes an acousto-optical element.

* * * * *